United States Patent [19]

Marhanka

[11] 4,390,605
[45] Jun. 28, 1983

[54] SOURCE OF ELECTRICITY

[76] Inventor: Frank D. Marhanka, 30 Ruth Dr., Florissant, Mo. 63031

[21] Appl. No.: 16,360

[22] Filed: Mar. 1, 1979

Related U.S. Application Data

[63] Continuation-in-part of Ser. No. 852,708, Nov. 18, 1977, abandoned, and a continuation-in-part of Ser. No. 852,925, Nov. 18, 1977, abandoned.

[51] Int. Cl.³ .............................................. H01M 6/00
[52] U.S. Cl. .................................................. 429/218
[58] Field of Search ..................... 429/218, 106, 107; 136/208, 209, 210, 211, 212, 226, 227; 310/308, 303, 305

Primary Examiner—Anthony Skapars
Attorney, Agent, or Firm—Rogers, Eilers & Howell

[57] ABSTRACT

A source of electricity has a first electrode, a second electrode which is spaced from the first electrode and which is made from a metal that is displaced in the electromotive series from the metal of the first electrode, a first mass which is electrically conductive and which contains particulates and liquid and which is in electrically-conducting engagement with the inner surface of the first electrode, a second mass which is electrically conductive and which contains particulates and liquid and which is in electrically-conducting engagement with the inner surface of the second electrode and which has at least one particulate that is different from all of the particulates in the first mass, an interface between the confronting surfaces of the first and second masses, a polarity-imparting material in one of the masses, and that polarity-imparting material and the liquids enabling the masses to cause the electrodes to supply a unidirectional flow of current to any load which is connected across them.

11 Claims, 9 Drawing Figures

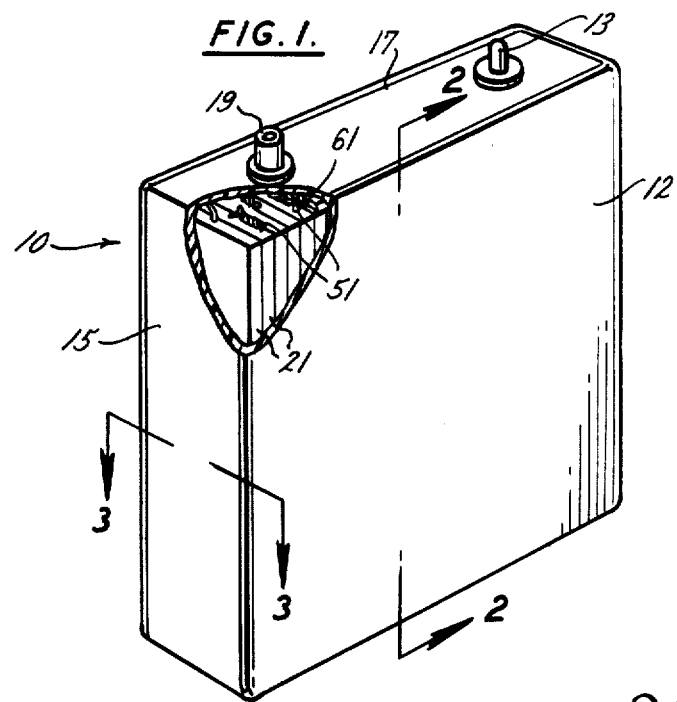
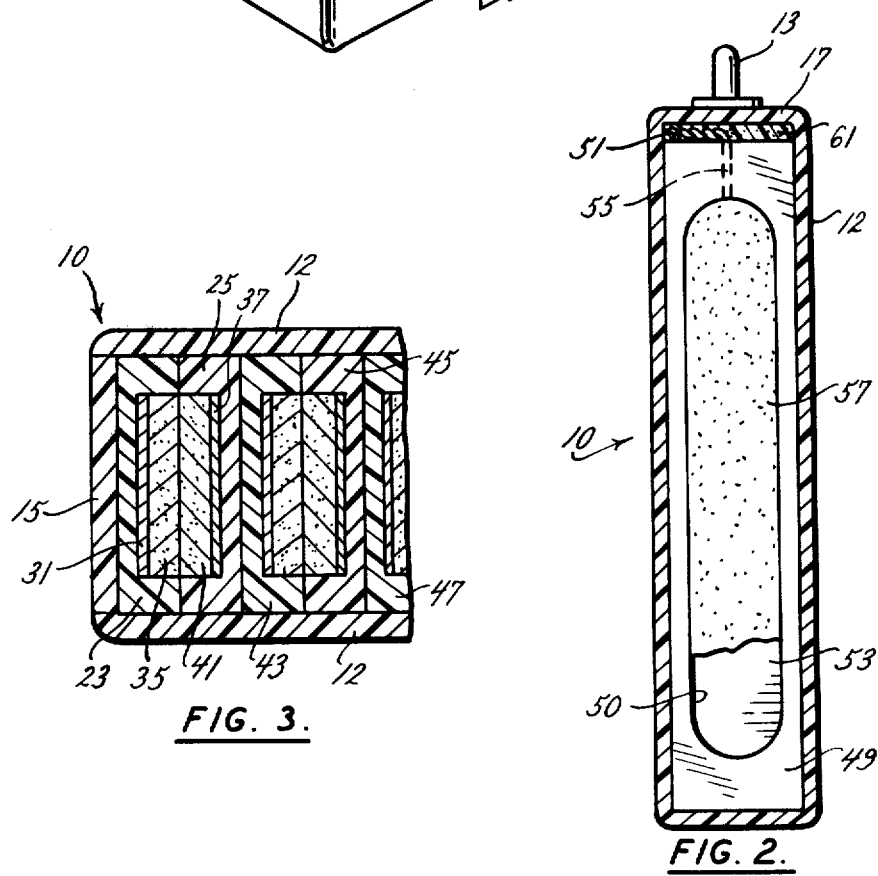

SOURCE OF ELECTRICITY

This is a continuation-in-part of my application Ser. No. 852,708 for Ionic Breeder and of my application Ser. No. 852,925 for Method Of Manufacturing Solar Cells and Ionic Breeders which were filed on Nov. 18, 1977, both now abandoned.

SUMMARY OF THE INVENTION

A source of electricity has a first electrode, a second electrode which is spaced from the first electrode, the first electrode and the second electrode being made of metals which are spaced apart in the electromotive series, a first mass which is electrically conductive and which contains particulates and liquid and which abuts, and is in electrically-conducting engagement with, the inner surface of the first electrode, a second mass which is electrically-conductive and which contains particulates and liquid and which abuts, and is in electrically-conducting engagement with, the inner surface of the second electrode and which has at least one particulate that is different from all of the particulates in the first mass, the first mass and the second mass have confronting faces that abut, and that are in intimate electrical engagement with, each other, a polarity-imparting material in one of the masses, and that polarity-imparting material and the liquids enabling the masses to cause the electrodes to supply a unidirectional flow of current to any load which is connected across them.

BRIEF DESCRIPTION OF THE DRAWING

FIG. 1 is a partially fragmentary perspective view of one preferred source of electricity that is constructed in accordance with the teachings of the present invention;

FIG. 2 is a sectional end elevation view of the source of electricity shown in FIG. 1;

FIG. 3 is a sectional top elevational view of part of the source of electricity shown in FIG. 1;

DESCRIPTION OF THE PREFERRED EMBODIMENTS

Figure 4:
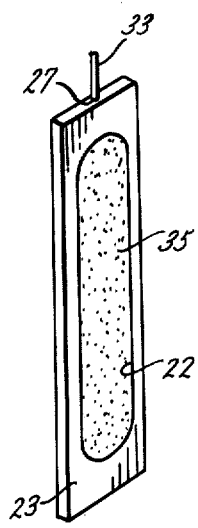
FIG. 4 is a perspective view of one-half of one cell of the source of electricity shown in FIG. 1.
Figure 5:
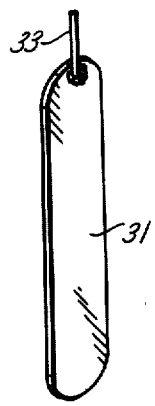
FIG. 5 is a perspective view of the electrode embedded within the half-cell shown in FIG. 4.

Referring particularly to FIGS. 1–6 and 8, the numeral 10 generally denotes one preferred embodiment of plural-cell source of electricity that is made in accordance with the principles and teachings of the present invention. That source has a casing 12 which is made from insulating material; and acrylic butyrite styrene, which is sold commercially under the acronym ABS, is an insulating material that has been found to be very useful. That casing has an integrally molded bottom, sidewalls and right-hand end wall. The numeral 15 denotes a left-hand end wall which is initially separate from the casing 12, but which is subsequently bonded to that casing by methylene chloride. The numeral 17 denotes a top which is initially separate from the casing 12 and also from the left-hand end wall 15; but which is subsequently bonded to that casing and to that end wall by methylene chloride. The numeral 13 denotes an electrode which extends upwardly through the top 17, and the numeral 19 denotes a further electrode which extends upwardly through that top. After that top has been bonded to the casing 12 and to the right-hand end wall 15, bonding material is used to bond that top to the electrodes 13 and 19, and thereby render the source 10 liquid-tight and air-tight.

Figure 8:
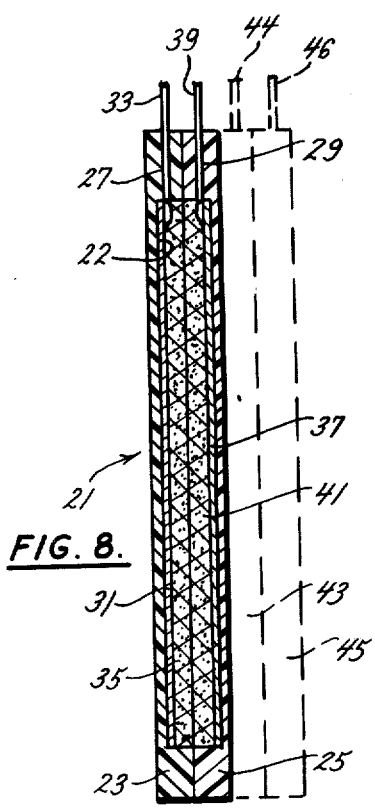
FIG. 8 is a vertical section through one of the cells of the source of electricity of FIG. 1, and it shows an adjacent cell by dotted lines.

The numeral 21 in FIG. 8 generlly denotes a single-cell source of electricity; and that cell is just one of a number of cells within the source 10 of FIG. 1. In the particular embodiment shown, the casing 12 is large enough to accommodate twenty cells 21, but it will usually be desirable to have that casing made so it will accommodate about ten cells 21.

The cell 21 has a left-hand body portion 23 and a right-hand body portion 25; and those body portions are made from insulating material. Acrylic butyrite styrene, which is sold commercially under the acronym ABS, is an insulating material that has been found to be very useful.

Figure 6:
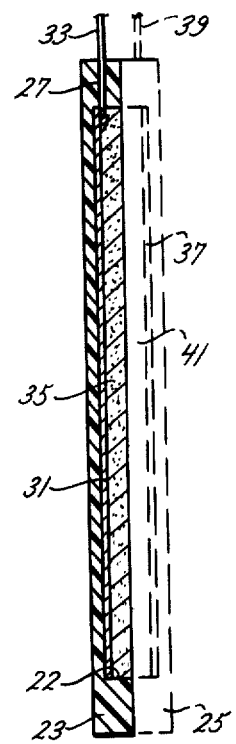
FIG. 6 is a vertical section, on a larger scale, through the one-half cell shown in FIG. 4, and it shows the other half of that cell in dotted lines.

As shown particularly by FIGS. 4, 6 and 8, the body portion 23 has an elongated recess 22 in the right-hand surface thereof; and that recess has elongated parallel sides and convex ends. In the said preferred embodiment, the convex ends are defined by arcs of one-quarter of an inch radii; and the maximum length of each recess is four inches. The length of each straight side is three and one-half inches, the cavity is one-half of an inch wide, and it is three thirty-seconds of an inch deep. The right-hand body portion 25 has a corresponding recess; and those recesses are in precise registry with each other when the body portions 23 and 25 are disposed in confronting and abutting engagement as shown by FIG. 8. The numeral 27 denotes a small diameter passage which extends inwardly from the upper end of the body portion 23 to the upper end of the recess 22. The numeral 29 denotes a corresponding small diameter passage which extends inwardly from the upper end of the body portion 25 to the upper end of the recess within that body portion.

The numeral 31 denotes an electrode which has the same configuration as the recess 22 and which is dimensioned to fit closely within that recess. A conductor 33 is soldered or otherwise bonded to the upper end of electrode 31; and that conductor is threaded upwardly through the passage 27 as the electrode 31 is telescoped into the recess 22. The numeral 35 denotes a mass which consists of particulates and liquid, which abuts the inner surface of electrode 31, which fills the rest of the recess 22, and which initially projects about eight to ten thousandths of an inch beyond the adjacent surface of body portion 23.

The numeral 37 denotes an electrode which has the configuration of the recess in the body portion 25, and that electrode is dimensioned to fit closely within that recess. A conductor 39 is soldered or otherwise bonded to the upper end of electrode 37; and that conductor is threaded upwardly through the passage 29 as the electrode 37 is telescoped into the recess in the body portion 25. The numeral 41 denotes a mass which consists of particulates and liquid, which abuts the inner face of electrode 37, which fills the rest of that recess, and which initially projects about eight to ten thousandths of an inch beyond the adjacent surface of body portion 25.

In the preferred embodiment of the present invention, each of the electrodes has a thickness of twenty thousandths of an inch; and hence each of the masses 35 and 41 will initially have a thickness of about one hundred and two to one hundred and four thousandths of an inch. However, after the masses 35 and 41 are set in face-to-face engagement, a pressure between seventy-five to one hundred pounds per square inch is applied to the outer surfaces of the body portions 23 and 25 to compress the masses 35 and 41 and to force the inner surfaces of those body portions into intimate engagement.

Different metals, such as zinc, aluminum, lead, silver-plated copper and nickel-plated copper could be used as the electrode 31, but zinc or aluminum are preferred. The electrode 37 could be made from different metals, but preferably is made from copper. The mass 35 could be made from many different compositions of particulates and liquid; and, similarly, the mass 41 could be made from many different compositions of particulates and liquid. Examples of a number of representative sources of electricity, all but three of which are single cell sources, and of their no-load output values are:

EXAMPLE 1

| Electrode 31 | Mass 35 | Mass 41 | Electrode 37 |
|---|---|---|---|
| Zinc | 8 grams aluminum oxide | 8 grams aluminum oxide | Copper |
| | 2 grams graphite | 2 grams graphite | |
| | ½ gram red phosphorus | 1 gram copper sulfate | |
| | 2 grams zinc powder | 3 grams copper powder | |
| | ½ gram zirconium oxide | ½ gram zirconium oxide | |
| | 2 grams gelatin | 1 gram bismuth oxide | |
| | | 1 gram gelatin | |
| | Sufficient de-ionized water and sodium chlorate (in the ratio of 100-1) to form a smooth putty-like paste. | Sufficient de-ionized water and sodium chlorate (in the ratio of 100-1) to form a smooth putty-like paste. | |

1.3 VOLTS - 200 MILLIAMPERES

EXAMPLE 2

| Electrode 31 | Mass 35 | Mass 41 | Electrode 37 |
|---|---|---|---|
| Zinc | 8 grams aluminum oxide | 8 grams of aluminum oxide | Copper |
| | 2 grams graphite | 2 grams graphite | |
| | ½ gram red phosphorus | 2 grams copper sulfate | |
| | 1/20 gram mercuric oxide | 4 grams copper powder | |
| | 2 grams gelatin | 1/20 gram of mercuric oxide | |
| | | 2 grams gelatin | |
| | Sufficient de-ionized water and sodium chlorate (in the ratio of 100-1) to form a smooth putty-like paste. | Sufficient de-ionized water and sodium chlorate (in the ratio of 100-1) to form a smooth putty-like paste. | |

-continued

| Electrode 31 | Mass 35 | Mass 41 | Electrode 37 |
|---|---|---|---|

1.2 VOLTS - 90 MILLIAMPERES

EXAMPLE 3

| Electrode 31 | Mass 35 | Mass 41 | Electrode 37 |
|---|---|---|---|
| Zinc | 8 grams aluminum oxide | 8 grams aluminum oxide | Copper |
| | 1 gram graphite | 1 gram graphite | |
| | 1 gram red phosphorus | 2 grams bismuth oxide | |
| | 3 grams of zinc powder | 1 gram copper sulfate | |
| | 1 gram of gelatin | 6 grams copper powder | |
| | | 1 gram gelatin | |
| | Sufficient de-ionized water and sodium chlorate (in the ratio of 100-1) to form a smooth putty-like paste. | Sufficient de-ionized water and sodium chlorate (in the ratio of 100-1) to form a smooth putty-like paste. | |

1.1 VOLTS - 80 MILLIAMPERES

EXAMPLE 4

| Electrode 31 | Mass 35 | Mass 41 | Electrode 37 |
|---|---|---|---|
| Zinc | 8 grams aluminum oxide | 8 grams aluminum oxide | Copper |
| | 1 gram graphite | 1 gram graphite | |
| | 1 gram red phosphorus | 2 grams bismuth oxide | |
| | 1 gram zirconium oxide | 1 gram copper powder | |
| | 1 gram of gelatin | 1 gram copper sulfate | |
| | | 1 gram gelatin | |
| | Sufficient de-ionized water and sodium chlorate (in the ratio of 100-1) to form a smooth putty-like paste. | Sufficient de-ionized water and sodium chlorate (in the ratio of 100-1) to form a smooth putty-like paste. | |

1.2 VOLTS - 62 MILLIAMPERES

EXAMPLE 5

| Electrode 31 | Mass 35 | Mass 41 | Electrode 37 |
|---|---|---|---|
| Zinc | 20 grams aluminum oxide | 20 grams aluminum oxide | Copper |
| | 2 grams aluminum powder | 6 grams bismuth oxide | |
| | | 2 grams copper powder | |
| | | 1 milligram of mercuric oxide | |
| | | 2 grams copper sulfate | |
| | Sufficient de-ionized water and gelatin and sodium chlorate (in the ratio of 100-14-1) to form a smooth putty-like paste. | Sufficient de-ionized water and gelatin and sodium chlorate (in the ratio of 100-14-1) to form a smooth putty-like paste. | |

1 VOLT - 84 MILLIAMPERES

EXAMPLE 6

| Electrode 31 | Mass 35 | Mass 41 | Electrode 37 |
|---|---|---|---|
| Zinc | 8 grams aluminum oxide<br>6 grams silicon<br>1 gram red phosphorus<br>1 gram aluminum sulfate<br>Sufficient de-ionized water and gelatin (in the ratio of 100-14) to form a smooth putty-like paste. | 8 grams aluminum oxide<br>6 grams silicon<br>1 gram boron<br>1 gram copper sulfate<br>Sufficient de-ionized water and gelatin (in the ratio of 100-14) to form a smooth putty-like paste. | Copper |

9 VOLTS - 150 MILLIAMPERES

EXAMPLE 7

| Electrode 31 | Mass 35 | Mass 41 | Electrode 37 |
|---|---|---|---|
| Aluminum | 8 grams aluminum oxide<br>2 grams aluminum powder<br><br><br>Sufficient de-ionized water and gelatin and sodium chlorate (in the ratio of 100-14-1) to form a smooth putty-like paste. | 8 grams aluminum oxide<br>2 grams copper powder<br>5 milligrams mercuric oxide<br>2 grams copper sulfate<br>Sufficient de-ionized water and gelatin and glycerine and sodium chlorate (in the ratio of 100-14-2-1) to form a smooth putty-like paste. | Copper |

8 VOLTS - 100 MILLIAMPERES

EXAMPLE 8

| Electrode 31 | Mass 35 | Mass 41 | Electrode 37 |
|---|---|---|---|
| Zinc | 32 grams aluminum oxide<br>16 grams graphite<br>1 gram red phosphorus<br>20 grams zinc powder<br>2 grams zirconium oxide<br>4 grams gelatin<br><br>Sufficient de-ionized water and sodium chlorate (in the ratio of 100-1) to form a smooth putty-like paste. | 27 grams aluminum oxide<br>12 grams bismuth oxide<br>8 grams copper sulfate<br>8 grams graphite<br>30 grams copper powder<br><br>2 grams zirconium oxide<br>4 grams gelatin<br><br>Sufficient de-ionized water and sodium chlorate (in the ratio of 100-1) to form a smooth putty-like paste. | Copper |

9.5 VOLTS - 250 MILLIAMPERES

In the hereinbefore-described examples, the aluminum oxide was Al2O3, Grade RH 130 Alpha Alumina 95%, the silicon was 100 to 400 mesh metallurgical Grade (99.5%) silicon, and the gelatin was industrial grade gelatin G-7, Granular 100 Bloom. The copper powder and boron powder were 200 to 400 mesh in size, the aluminum oxide was 200 mesh in size, the bismuth oxide was 400 mesh in size, and the graphite and copper sulfate were even finer in size.

The various particulates for each mass in Examples 1-4 and 8 are tumbled in the dry state until they are thoroughly mixed. Thereafter, admixed de-ionized water and sodium chlorate for that mass are added and stirred. The gelatin for each mass in Examples 5-7 is not added to the particulates of that mass in dry form. Instead, that gelatin is placed in suspension by heating it in de-ionized water at a temperature of one hundred and seventy-five degrees Fahrenheit. Thereafter, the sodium chlorate, and in example 7 the sodium chlorate and glycerine, are added to the suspension of de-ionized water and gelatin in the proper ratio. The resulting liquid is then stirred into the previously-tumbled dry particulates.

If desired, boron could be substituted for the bismuth oxide in the hereinbefore-described examples. Also, ammonium chloride could be substituted for the sodium chlorate. Further, metallurgical grade silicon powder could be substituted for the aluminum oxide. Additionally, corn starch could be substituted for the gelatin. However, it is preferred to use the hereinbefore-described examples without change, alteration or substitution.

If desired, a homogeneous mass, rather than two discrete masses, could be disposed between, and in electrically-conducting engagement with, the electrodes 31 and 37. Examples of cells which are provided with such a homogenous mass are:

EXAMPLE I

| Electrode 31 | Homogeneous Mass | Electrode 37 |
|---|---|---|
| Zinc | 35 grams aluminum oxide<br>20 grams silicon<br>2 grams copper sulfate<br>1 gram red phosphorus<br>2 grams graphite<br>1/20 gram mercuric oxide<br>4 grams copper powder<br>10 grams gelatin<br>Sufficient de-ionized water and sodium chlorate (in the ratio of 100-1) to form a smooth putty-like paste. | Copper |

.7 VOLTS - 120 MILLIAMPERES

EXAMPLE II

| Electrode 31 | Homogeneous Mass | Electrode 37 |
|---|---|---|
| Zinc | 17 grams aluminum oxide<br>12 grams silicon<br>4 grams copper sulfate<br>2 grams red phosphorus<br>1 gram graphite<br>1/20 gram mercuric oxide<br>5 grams gelatin<br>2 grams zinc powder<br>Sufficient de-ionized water and sodium chlorate (in the ratio of 100-1) to form a smooth putty-like paste. | Copper |

.75 VOLT - 25 MILLIAMPERES

EXAMPLE III

| Electrode 31 | Homogeneous Mass | Electrode 37 |
|---|---|---|
| Aluminum | 15 grams peat based carbon sold by Fisher Scientific as Carbon | Copper |

-continued

| Electrode 31 | Homogeneous Mass | Electrode 37 |
|---|---|---|
| | Decolorizing Neutral under the trademark NORIT<br>3 grams aluminum oxide<br>3 grams silicon<br>Sufficient de-ionized water and gelatin and sodium chlorate (in the ratio of 100-14-1) to form a smooth putty-like paste.<br>.75 VOLTS - 280 MILLIAMPERES | |

EXAMPLE IV

| Electrode 31 | Homogeneous Mass | Electrode 37 |
|---|---|---|
| Aluminum | 10 grams aluminum oxide<br>4 grams corn starch<br>1 gram copper sulfate<br>1 gram zinc sulphate<br>2 grams bismuth oxide<br>1 gram sodium chlorate<br>Sufficient de-ionized water and gelatin and sodium chlorate (in the ratio of 100-14-1) to form a smooth putty-like paste.<br>.75 VOLT - 425 MILLIAMPERES | Copper |

EXAMPLE V

| Electrode 31 | Homogeneous Mass | Electrode 37 |
|---|---|---|
| Aluminum | 10 grams aluminum oxide<br>1 gram copper sulfate<br>1 gram zinc chloride<br>1 gram ammonium chloride<br>1 gram sodium chlorate<br>Sufficient de-ionized water and gelatin and sodium chlorate (in the ratio of 100-14-1) to form a smooth putty-like paste.<br>.8 VOLT - 480 MILLIAMPERES | Copper |

In Examples I and II, as in Examples 1-4 and 8, the gelatin is added to each mass in dry form. In Examples III-V, as in Examples 4-7, the gelatin is suspended in the de-ionized water before that water is added to the tumbled dry particulates.

The gelatin is much more effective and useful when it is converted from dry form to a suspension in the de-ionized water before it is added to the dry particulates than when it is added in dry form to those particulates and then wet with the de-ionized water and its additives. Consequently, when any of the hereinbefore-described examples are used as commercial sources of electricity, the gelatin therefor will be suspended in the de-ionized water and than added to the dry particulates.

In making the sources of electricity of Examples I-V, homogeneous masses rather than diverse and discrete masses were used. However, for convenience, the recess 22 in the body portion 23 had the electrode 31 inserted therein and then was slightly overfilled with part of the homogeneous mass; and the recess in the body portion 25 had the electrode 37 inserted therein and then was slightly overfilled with the rest of that homogeneous mass. As the confronting faces of the recesses in the body portions 23 and 25 were moved toward each other, the confronting portions of the two parts of the homogeneous mass engaged each other and were, under the seventy-five to one hundred pounds per square inch pressure, merged into each other to become a single homogeneous mass.

Referring particularly to FIG. 3, the numeral 43 denotes the left-hand body portion of a second single cell source of electricity; and the numeral 45 denotes the right-hand body portion of that cell. Preferably, those body portions and the electrodes and the masses enclosed and confined thereby will be identical to the body portions 23 and 25, to the electrodes 31 and 37, and to the masses 35 and 41 of the cell 21 of FIG. 8. The numeral 47 denotes the left-hand body portion of a still further single cell source of electricity.

Referring particularly to FIG. 2, the numeral 49 denotes the right-hand body portion of yet another cell within the source of electricity 10 of FIG. 1. A recess 50 is formed in the face of that body portion; and an electrode 53 is disposed within that recess. A conductor 55 is soldered or otherwise bonded to the upper end of that conductor, and it extends upwardly through the body portion 49. The numeral 57 denotes a mass which preferably is identical to the mass 41. A body portion, which preferably is identical to the body portion 23, will be disposed in confronting engagement with the body portion 49; and the mass in that left-hand body portion will abut the mass 57.

Once the masses in the body portions of any given cell have been set in abutting relation, a screw press or piston press will be used to apply a fixed pressure, of between seventy-five and one hundred pounds per square inch, to those body portions to compress those masses. Thereafter, while those masses are held under that fixed pressure, all four sides of the joint between those body portions will be bonded and sealed—to provide an air-tight and liquid-tight seal which will prevent loss of any liquid from those masses, and also to maintain the fixed pressure on those masses. The bonding and sealing of those four sides of that joint will preferably be done by welding together the abutting surfaces of the acrylic butyrite styrene body portions; but, if desired, those abutting surfaces could be bonded and sealed by methylene chloride or some other sealant. Thereafter, a number of individually-compressed and sealed cells can be disposed within the casing 12 of FIGS. 1-3.

If desired, the various cells which are constituted by the body portions 23 and 25, the body portions 43 and 45, the body portion 47 and its right-hand body portion, not shown, and the body portion 49 and its left-hand body portion, not shown, plus other similar cells, can be disposed in face-to-face relation within the casing 12 without having those body portions bonded and sealed together. Prior to the time those various cells were disposed within that casing, the confronting surfaces of the masses in the recesses of the body portions of those cells would be pressed into intimate engagement with each other by finger pressure; but no effort would be made to provide and maintain a heavy pressure between those surfaces until the end wall 15 was assembled with that casing. Also, no effort would be made to seal the joints between the confronting edges of those body portions. Such a procedure would obviate the time and labor which would be required to press the left-hand and right-hand body portions of each cell into intimate engagement and then seal them to each other.

Once the various un-sealed cells of the source of electricity 10 had been disposed within the casing 12, the left-hand end wall 15 for that casing would be set within the open left-hand end of that casing 12. Thereafter, while the right-hand end wall of casing 12 was held stationary, a pressure-applying screw or piston would engage the end wall 15 to force that left-hand end wall inwardly relative to the open left-hand end of casing 12 and into intimate engagement with the outer face of the left-hand body portion of cell 21. At such time, methylene chloride would be used to bond that end wall to the bottom and side walls of that casing—to provide a tight seal and to maintain the pressure which that end wall applies to all of the un-sealed cells. Once the methylene chloride had dried and set solidly, the pressure applied by the screw or piston could be released; and thereafter the end wall 15 would continue to hold the confronting faces of the masses 35 and 41, in all of the various unsealed cells, in engagement under a pressure in the range of seventy-five to one hundred pounds per square inch.

Whether the various cells for the source of electricity 10 of FIG. 1 are bonded and sealed before they are disposed within the casing 12 or are compressed together after they are set within that casing, those cells will be oriented so the conductors thereof are exposed. Connectors 51 will be used to suitably interconnect the conductors of those various cells. Where the voltages of those various cells are to be added, the conductor 33 will be connected to the electrode 19 of the source of electricity 10, but the conductor 39 will be connected to a conductor 44 which extends upwardly from the body portion 43 of FIGS. 3 and 8; and a conductor 46 which extends upwardly from the body portion 45 of FIGS. 3 and 8 will be connected to a conductor, not shown, which extends upwardly from the body portion 47 of FIG. 3. The resulting series connecting of the various cells of the source of electricity 10 will be continued so the voltage outputs of all of those cells will be added to provide a desirably-high voltage rating for that source of electricity. On the other hand, if a low voltage, high current source of electricity 10 is desired, the conductors 33 and 44 and the conductors of the other left-hand body portions of all of the cells in that source of electricity will be connected together and to the electrode 19, whereas the conductors 39, 46, 55 and the conductors of the other right-hand body portions will be connected together and to the electrode 13. Where moderately-high voltage and moderately-high current sources of voltage are desired, the conductors of the various cells can be connected in series-parallel relation, and then suitably connected to the electrodes 19 and 13.

After the conductors of the various cells have been properly interconnected by the conductors 51, the electrodes 13 and 19 will be connected to those connectors and then will be oriented so they extend upwardly in parallel relation and at a distance which corresponds to spaced holes in the top 17. At such time, the air space within the upper portion of the casing 12 will be filled with a suitable dielectric 61 of a sealing nature; and that dielectric will overlie and embed the connectors 51 and the upper portions of the conductors of the various cells. One such dielectric is sold by the Dow Corning Company under the name Silicon Rubber; and another such dielectric is sold by the General Electric Company under the name Silicon Rubber Caulking.

Once the air space within the upper portion of the cavity 12 has been filled with the dielectric 61, the spaced holes in the top 17 will be telescoped downwardly over the electrodes 13 and 19; and then that top will be moved into the position shown by FIGS. 1 and 2. At such time, methylene chloride will be applied to all four sides of that top, and also to the holes in that top which accommodate the electrodes 13 and 19. That methylene chloride will not only bond the top 17 in position within the upper end of casing 12, but also will help render that casing liquid-tight and air-tight. All of this means that the source of electricity 10 in FIG. 1 will have a number of cells therein which have the confronting surfaces of the masses 35 and 41 thereof held in intimate engagement by pressure, and that those cells will be protected against any loss therefrom of the liquid therein.

In each of the sources of electricity of the foregoing Examples 1-8, the mass 35 has at least one particulate which is different from all of the particulates in the mass 41 of that source of electricity. Also, the mass 41 in each of those sources of electricity has at least one particulate which is different from the particulates in the mass 35 of that source of electricity. Further, each of the sources of electricity in Examples 1-8 has at least one particulate therein which is a polarity-imparting material. Phosphorus, boron and aluminum are three of the polarity-forming particulates, but bismuth oxide, copper and zinc also perform a polarity-forming function. Various other of the particulates perform a depolarizing function.

Figure 7:
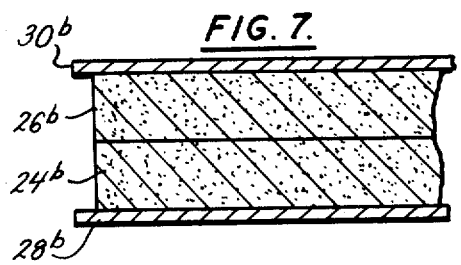
FIG. 7 is a fragmentary side elevational view, partially in section, of another form of cell for a source of electricity.

Referring particularly to FIG. 7, the numeral 28b denotes a planar conductor element or electrode, and the numeral 30b denotes a further planar conductor element or electrode which is displaced from the conductor element 28b. The numeral 24b denotes a mass which is planar and which abuts, and is in electrically-conducting engagement with, the upper surface of the electrode 28b. The numeral 26b denotes a mass which is planar and which abuts, and is in electrically-conducting engagement with, the lower surface of the electrode 30b. The confronting surfaces of the masses 24b and 26b abut each other, and they are held in intimate engagement with each other by a pressure of between seventy-five and one hundred pounds per square inch.

The forms and configurations of the conductor elements 28b and 30b, and the forms and configurations of the masses 24b and 26b, of FIG. 7 can be identical with the forms and configurations of the identically-numbered components in my application Ser. No. 852,708. The masses 24b and 26b can be of any desired size; but the confronting surfaces thereof will be held in intimate engagement throughout substantially the entire areas thereof. Also the source of electricity which is shown by FIG. 7 will be suitably encased within an air-tight and liquid-tight housing, not shown. If desired, the masses 24b and 26b and the conductor elements 28b and 30b of FIG. 7 could be the masses and electrodes of any of the sources of electricity of Examples 1-8.

Figure 9:
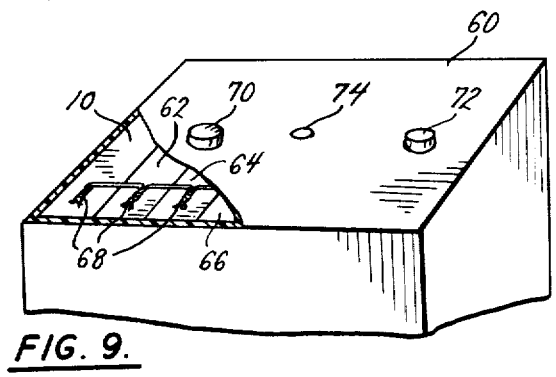
FIG. 9 is a partially fragmentary perspective view of a source of electricity that is constructed from a number of sources of electricity of the kind shown in FIG. 1.

Referring particularly to FIG. 9, the numeral 60 denotes a housing in which a number of plural-cell sources of electricity, such as the plural-cell source of electricity 10 of FIGS. 1-3, can be held. Some of those plural-cell sources of electricity are denoted by the numerals 62, 64 and 66. A connector 68 will interconnect all of the electrodes 19 of those plural-cell sources of electricity and a further connector, not shown, will interconnect all of the electrodes 13 of those various plural-cell sources of electricity whenever it is desirable for those sources of electricity to be connected in parallel relation. Thereafter, the connector 68 will be connected to the terminal 70, and the other connector, not shown, will be connected to the terminal 72 of housing 60.

A small opening 74 in the top of the housing 60 will be used to evacuate enough of the air from that housing to reduce the pressure within that housing to about six inches of mercury. Thereafter, sufficient inert gas, such as argon or carbon dioxide, will be introduced into that opening to provide a positive pressure within that housing of three inches of mercury. While that positive pressure is being maintained, the opening 74 will be closed; and thereupon the housing 60 will be hermetically sealed and will have a super-atmospheric pressure of three inches of mercury therein. The pressurized inert gas within housing 60 will tend to minimize the loss of any liquid from any mass in any of the cells in any plural-cell source of electricity which might experience a breakdown in any part of the methylene chloride seals thereof.

The sources of electricity of the present invention which, like the sources of electricity of Examples 1–8, have diverse and discrete masses in engagement with each other tend to develop voltage-time curves under "load" that differ from the voltage-time curves of primary batteries under "load." Specifically, the voltages of those sources of electricity increase under "load" for a period of time before they begin to decrease, whereas the voltages of primary batteries under "load" begin to decrease immediately and then continue to decrease. One such source of electricity had (1) an aluminum electrode, (2) a planar mass constituted of seven grams of aluminum oxide, one gram of phosphorus, two grams of aluminum powder, and sufficient de-ionized water and gelatin and sodium chlorate (in the ratio of 100-14-1) to form a smooth putty-like paste, (3) a planar mass constituted of seven grams of aluminum oxide, four grams of copper powder, and sufficient de-ionized water and gelatin and sodium chlorate (in the ratio of 100-14-1) to form a smooth putty-like paste, and (4) a copper electrode; and that source was connected to a ten thousand ohm load for thirty-two days, was then disconnected from that load for sixty days, and had a "dead short" connected across it for seven days. At the time it was made, that source of electricity had a "no load" voltage of six-tenths (0.6) of a volt and a "no load" current of six (6) milliamperes, and at the time the "dead short" was disconnected from it, that source had a "no load" voltage of one and one-quarter (1.25) volts and a "no load" current of sixty (60) milliamperes; and it was then delivered to a testing group for formal testing. During that formal testing, that source of electricity was connected across a two hundred (200) ohm resistive load; and the voltage supplied by that source increased under load from about thirty-five hundredths (0.35) of a volt to about fifty-three hundredths (0.53) of a volt. The voltage of that source of electricity increased to four tenths (0.4) of a volt in less than forty hours after the beginning of that testing, increased to forty-four hundredths (0.44) of a volt by eighty hours, increased to five tenths (0.5) of a volt by two hundred hours, increased to fifty-three hundredths (0.53) of a volt between six hundred and eighty and seven hundred and sixty hours, and did not decrease to thirty-two hundredths (0.32) of a volt until (2400) twenty-four hundred hours after the beginning of that testing.

Another source of electricity, which had identical electrodes and masses, was connected to a ten thousand ohm load for three months on a two week "on" and a two week "off" schedule. At the time it was made, that source of electricity had a "no load" voltage of six-tenths (0.6) of a volt and a "no load" current of ten (10) milliamperes, and at the end of the three months that source of electricity had a "no load" voltage of eighty-five hundredths (0.85) of a volt and a "no load" current of fifty (50) milliamperes; and it was then delivered to the testing group for formal testing. During that formal testing, that source of electricity was connected across a fifty (50) ohm resistive load; and the voltage supplied by that source increased under load from about thirty-three hundredths (0.33) of a volt to about forty-four hundredths (0.44) of a volt. The voltage of that source of electricity increased to thirty-five hundredths (0.35) of a volt in less than ten hours after the beginning of that testing, increased to four tenths (0.4) of a volt by thirty hours, increased to forty-five hundredths (0.44) of a volt between one hundred and twenty to one hundred and sixty hours, and did not decrease to sixteen hundredths (0.16) of a volt until eleven hundred and eighty (1180) hours after the beginning of that testing.

A ten cell source of electricity had (1) a zinc electrode of the size and configuration of electrode 31, (2) a planar mass of the size and configuration of the mass 31 which was constituted by seven grams of aluminum oxide, one gram of phosphorus, one-tenth gram of mercuric oxide, two grams of graphite, and sufficient de-ionized water and gelatin and sodium chlorate (in the ratio of 100-14-1) to form a smooth putty-like paste, (3) a planar mass of the size and configuration of the mass 41 which was constituted by seven grams of aluminum oxide, two grams of graphite, two grams of copper sulfate, and sufficient de-ionized water and gelatin and sodium chlorate (in the ratio of 100-14-1) to form a smooth putty-like paste, and (4) a copper electrode of the size and configuration of electrode 27; and that source had a "no load" voltage of nine and one-half (9.5) volts and a "no load" current of one hundred and eighty milliamperes. That source was connected across a two volt Calectro G. C. Electronics incandescent lamp which had a "cold" ohmic resistance of two thousand (2000) ohms; and, after being connected across that lamp continuously for forty (40) days, was still brightly illuminating that lamp. As a result, it should be apparent that the sources of electricity have substantial current-supplying capabilities.

Although they are referred to herein and in the appended claims as particulates, some of the components of the masses of the various sources of electricity of the present invention may dissolve or ionize when the liquid of their mass is added. Also some of those components may dissolve or ionize during the operation of those sources of electricity. Hence, it should be understood that "particulates" comprehend materials in dissolved or ionized form as well as in solid form.

Whereas the drawing and accompanying description have shown and described a number of embodiments of the present invention, it should be apparent to those skilled in the art that various changes may be made in the form of the invention without affecting the scope thereof.

What I claim is:

1. A source of electricity which comprises a first electrode, a second electrode that is spaced from said first electrode, said electrodes being made of metals that are spaced apart in the electromotive series, a first mass which contains particulates and liquid and which is electrically conductive, said mass abutting, and being in electrically-conducting engagement with, the inner surface of said first electrode, a second mass which contains particulates and liquid and which is electrically conductive, at least one of the particulates in said second mass being different from all of the particulates in said first mass, said second mass abutting, and being in electrically-conducting engagement with, the inner surface of said second electrode, said first mass and said second mass having confronting surfaces that abut, and are in intimate electrical engagement with, each other, one of said masses having a polarity-imparting material therein, and said polarity-imparting material and said liquids enabling said masses to cause said electrodes to supply a unidirectional flow of current through any load which is connected across them.

2. A source of electricity as claimed in claim 1 wherein said polarity-imparting material imparts an N characteristic to said one mass.

3. A source of electricity as claimed in claim 1 wherein said polarity-imparting material imparts a P characteristic to said one mass.

4. A source of electricity as claimed in claim 1 wherein said confronting surfaces of said masses are maintained under pressure to hold said surfaces in said intimate electrical engagement.

5. A source of electricity as claimed in claim 1 wherein one of the particulates in one of said masses is powder of the same metal of which one of said electrodes is composed.

6. A source of electricity as claimed in claim 1 wherein said polarity-imparting material is phosphorus.

7. A source of electricity as claimed in claim 1 wherein said polarity-imparting material is boron.

8. A source of electricity which comprises a first electrode, a second electrode that is spaced from said first electrode, said electrodes being made of metals that are spaced apart in the electromotive series, a mass which contains particulates and liquid and which is electrically conductive, said mass abutting, and being in electrically-conducting engagement with, the inner surface of said first electrode and also abutting, and being in electrically-conducting engagement with, the inner surface of said second electrode, said mass having a polarity-imparting material therein, and said polarity-imparting material and said liquid enabling said mass to cause said electrodes to supply a unidirectional flow of current through any load which is connected across them.

9. A source of electricity as claimed in claim 8 wherein said polarity-imparting material is phosphorus.

10. A source of electricity as claimed in claim 8 wherein a first body portion has a recess in which said first electrode is disposed before said mass is disposed in abutting, electrically-conducting engagement with said first electrode.

11. A source of electricity as claimed in claim 1 wherein a first body portion has a recess in which said first electrode is disposed before said mass is disposed in abutting, electrically-conducting engagement with said first electrode, and wherein a second body portion has a recess in which said second electrode is disposed before said second mass is disposed in abutting, electrically-conducting engagement with said second electrode.

* * * * *